United States Patent [19]

Hancock

[11] 4,449,365
[45] May 22, 1984

[54] LIFT, TILT AND STEERING CONTROL FOR A LIFT TRUCK

[75] Inventor: Peter D. Hancock, Muskego, Wis.

[73] Assignee: Allis-Chalmers Corporation, Milwaukee, Wis.

[21] Appl. No.: 311,592

[22] Filed: Oct. 15, 1981

Related U.S. Application Data

[62] Division of Ser. No. 95,923, Nov. 19, 1979, abandoned.

[51] Int. Cl.³ .................... B62D 5/06; F15B 11/16; F15B 13/06
[52] U.S. Cl. ........................................ 60/422; 60/423; 60/428; 180/132
[58] Field of Search ................ 60/421, 422, 423, 427, 60/428, 431; 180/132; 137/101; 91/516, 532; 414/629, 635

[56] References Cited

U.S. PATENT DOCUMENTS

| | | | |
|---|---|---|---|
| 3,443,380 | 5/1969 | Karazija | 60/427 X |
| 3,570,519 | 3/1971 | Bianchetta | 137/101 |
| 3,991,846 | 11/1976 | Chichester et al. | 60/423 |
| 4,002,220 | 1/1977 | Wible | 60/422 X |
| 4,044,786 | 8/1977 | Yip | 60/421 |
| 4,070,857 | 1/1978 | Wible | 60/422 X |

Primary Examiner—Irwin C. Cohen
Attorney, Agent, or Firm—Charles L. Schwab

[57] ABSTRACT

A lift truck hydraulic control system designed to conserve energy includes a pair of separately controlled pumps (21, 22). One pump (21) supplies pressure fluid to a valve (12) for a steering cylinder (11) by way of a high priority port (34) of a priority valve (32) with the low priority flow passing to parallel connected lift and tilt valves (19, 18) which control operation of the lift cylinder (15) and tilt cylinders (16, 17), respectively. The capacity of pump (21) is sufficient to provide proper, effective operation of the steering and tilt functions but is not adequate to provide hydraulic fluid flow for high speed expansion of the lift cylinder (15). The other pump (22) is operated to supply additional pressure fluid flow for high speed lift only when the lift valve (19) is shifted to a raise position. In one embodiment, a low speed lift is obtained by using the output of the pump (21) and a high speed lift is obtained by selectively adding the output of the second pump 22. This is achieved by operating the other pump (22) only when the lift valve (19) is placed in an extreme raise position. In another embodiment, the pumps (21, 22) are operated only "on demand," thereby further conserving energy.

1 Claim, 3 Drawing Figures

LIFT, TILT AND STEERING CONTROL FOR A LIFT TRUCK

This is a division of application Ser. No. 095,923, filed Nov. 19, 1979, now abandoned.

This invention relates to a hydraulic control system for the lift, tilt and steering functions of a lift truck and particularly to such a control system wherein a pair of hydraulic pumps for supplying pressure fluid are driven by separately controlled power means.

BACKGROUND OF THE INVENTION

Heretofore others have suggested and used hydraulic control systems for lift trucks wherein a pair of hydraulic pumps are used to supply pressure fluid. One such system is shown in U.S. Pat. No. 3,443,380 wherein one of two pumps supplies fluid to the lift cylinder by way of a passage bypassing the tilt and lift control valves. U.S. Pat. Nos. 4,002,220 and 4,070,857 show lift truck hydraulic systems in which a single pump supplies pressure fluid for the lift, tilt and steering functions and in which a priority valve is employed to provide priority flow of pressure fluid to the power steering mechanism.

BRIEF DESCRIPTION OF THE INVENTION

The hydraulic control system for the lift, tilt and steering cylinders of a lift truck includes a pair of hydraulic pumps, the first of which supplies fluid pressure to the steering cylinder by way of a priority valve with a low priority connection to the lift and tilt circuits. The second pump delivers pressure fluid to the lift control valve for high speed lift only when the lift control valve is placed in a predetermined "raise" position. In a second embodiment of the invention, the lift control valve may be moved to a first "raise" position in which low speed lift is achieved through use of flow from the first pump and also to a fully stroked "raise" position in which the second pump would be driven to supply pressure fluid for high speed lift. In a third embodiment of the invention the first pump is also operated on "demand," that is, the first pump is driven to deliver pressure fluid when the operator steers the vehicle, when the operator moves the lift control valve to a "raise" position or moves the tilt control valve from its neutral, hold position to either of its operating positions. In both the second and third embodiments of the invention, the second pump is not placed in operation for high speed lift unless the lift control valve is moved to a fully stroked "raise" position.

BRIEF DESCRIPTION OF THE DRAWINGS

Three different embodiments of the invention are illustrated in the drawings in which.

DETAILED DESCRIPTION OF THE DRAWINGS

Figure 1:
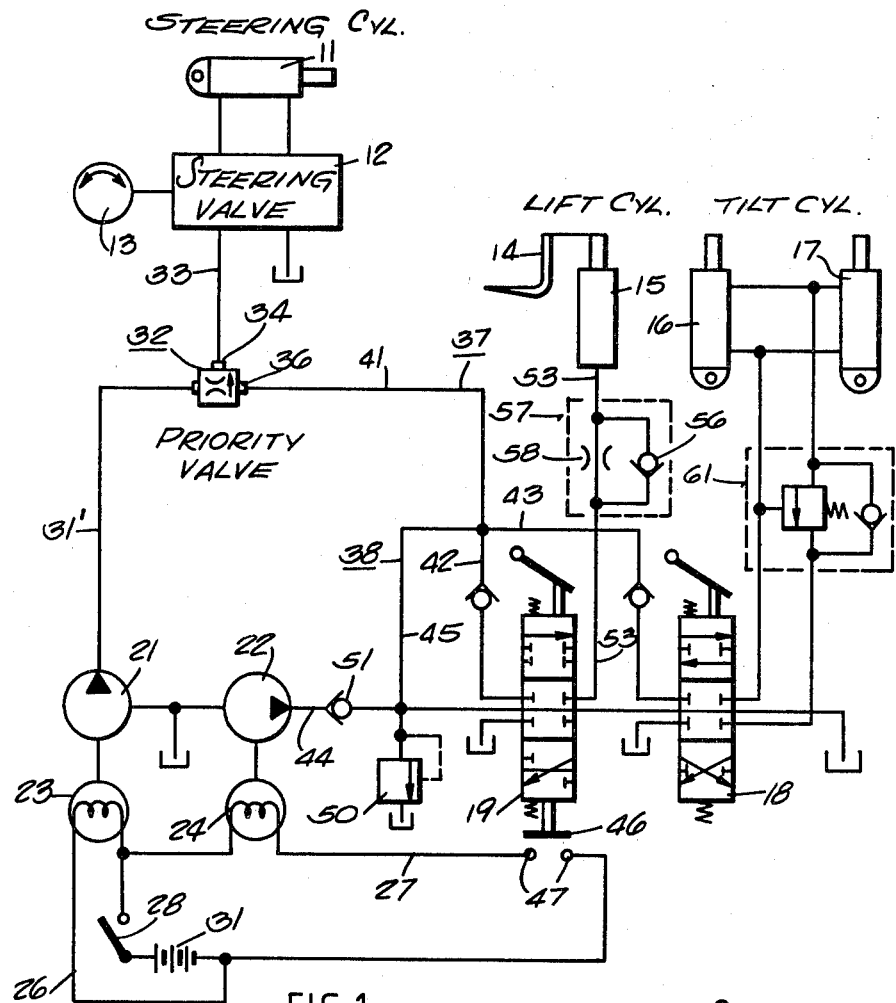
FIG. 1 is a schematic showing a first embodiment of a hydraulic control system for a lift truck.

FIG. 1 is a schematic illustration of a lift truck hydraulic control system which has particular utility in an electric lift truck. The hydraulic control system includes a steering motor or cylinder 11 which is controlled by a conventional steering valve 12 through movement of the manually operated steering wheel 13. The load carriage 14 of the lift truck is raised and lowered on the mast, not shown, by lift cylinder 15 controlled by lift control valve 19 and the mast is tilted about a transverse horizontal axis by a pair of tilt cylinders 16, 17 which are connected in parallel to a tilt control valve 18. A pair of hydraulic pumps 21, 22 are driven by electric motors 23, 24, respectively, through independently controlled circuits 26, 27. When the switch 28 at the operator's station is closed, power from a source of electricity, in the form of a battery 31, is connected to the motor 23, whereupon the motor 23 drives the pump 21 to deliver pressure fluid to a steering control circuit or conduit 31 interconnecting the pump 21 and a priority valve 32. A fluid passageway or circuit, in the form of conduit 33, is connected at one end in fluid receiving relation to a high priority output 34 of priority valve 32 and at its other end to the steering control valve 12. The priority valve 32 has a low priority output 36 delivering fluid not required by the steering mechanism to a pressure fluid delivery circuit 37 which includes a main conduit 41 connected to the output 36 and a pair of branch conduits 42, 43 connected in parallel to the main conduit 41 and in fluid delivery relationship to lift control valve 19 and tilt control valve 18. A fluid delivery circuit 38 interconnects the output of pump 22 with the lift cylinder 15 by conduit segments 44, 45, 42, 53 with the lift control valve 19 operatively interposed in the circuit 38. A relief valve 50 is provided for the fluid delivery circuit 38, which acts as a relief valve for both pumps.

The manually operated lift control valve 19 carries a control element in the form of an electrical contactor 46 on its lower end, as illustrated in FIG. 1, which, upon downward movement to a predetermined "raise" position, engages contacts 47 to complete an electric circuit. When the circuit 27 of electric motor 24 is thus energized, it drives pump 22 to deliver pressure fluid to the fluid delivery circuit 38.

During operation of a lift truck, such as an electric lift truck, the switch 28 is normally closed during operation of the truck thus causing the electric motor 23 to drive pump 21 to deliver pressure fluid to the priority valve 32. The priority valve 32 insures an adequate supply of pressure fluid for the steering function by way of conduit 33 between its high priority output 34 and the steering valve 12. Low priority flow, that is, fluid flow not utilized for steering purposes is exhausted by way of a low priority port or output 36 to the fluid delivery circuit 37. A one-way valve in the form of check valve 51 prevents flow from the low priority side of the priority valve 32 from passing to the pump 22 by way of conduit 41. Pressure fluid delivered by the pump 21 to the lift and tilt cylinder circuits 42, 43 by way of conduit 41 is sufficient in rate of flow for providing normal tilt operations and the pump 21 and motor 23 may be sized to no larger than necessary to provide steering and tilt functions. The volume of fluid supplied by pump 21 is not sufficient to provide lift speeds for the carriage 14 that are normally desired in a lift truck operation. However, the delivery of pump 21 is sufficient to produce a low speed lift operation. In the embodiment illustrated in FIG. 1, when the operator desires to operate the lift cylinder 15, that is, to expand it, the spool of the lift control valve 19 is moved downwardly to provide a fluid connection between circuit 42 and conduit 53. This downward movement of the spool of the valve 19 causes the contactor 46 to engage the contacts 47 thereby causing the electric motor 24 to drive the pump 22 to deliver sufficient pressure fluid to the lift control valve 19 and lift cylinder 15 to provide a high speed lift. During lifting, pressure fluid flows through a check valve 56 of a conventional flow regulator valve 57. During a lowering operation, the check valve 56 is closed and fluid is exhausted from the lift cylinder 15 through a restriction 58 in the flow regulator valve 57 which regulates the lowering speed of the carriage 14. The tilt cylinder control includes a counterbalance valve 61 of conventional construction which forms no part of the present invention.

Figure 2:
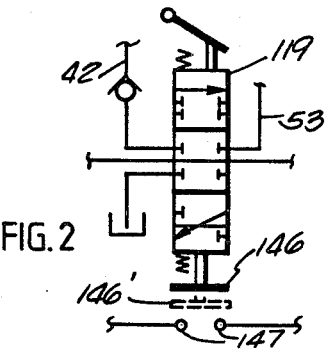
FIG. 2 illustrates a second embodiment of the invention in which the lift cylinder control valve must be fully stroked in the direction of its "raise" position before the second pump is driven to provide high speed lift.

Referring to FIG. 2, a modified lift control valve 119 is illustrated which provides a two-speed lift for the lift truck in which the invention is used. The spool of the lift control valve 119 may be shifted downwardly to a first "raise" position in which the contactor 146 moves to the position shown by dash lines 146'. In this first predetermined "raise" position the contactor 146 does not engage contacts 147, however, the lift valve 119 does establish a fluid connection between circuit 42 and conduit 53 thereby effecting delivery of pressure fluid from pump 21 to the lift cylinder 15 so as to provide a low speed lift for the lift truck carriage 14. If the operator moves the spool of the control valve 119 downwardly, a further distance to a second predetermined "raise" position in which the contactor 146 engages the contacts 147, the pump 22 will be driven, thus delivering sufficient fluid to the lift cylinder to provide a high speed carriage lift. Thus by using the embodiment of the invention illustrated in FIG. 2, the operator has a choice of low speed lifting without using energy in addition to that used to drive the pump 21. Pump 22 is driven only when the operator desires to have a high speed lift. It should be understood, of course, that during a lowering operation, fluid is exhausted from the lift cylinder 15 without the need for any pressure fluid.

Figure 3:
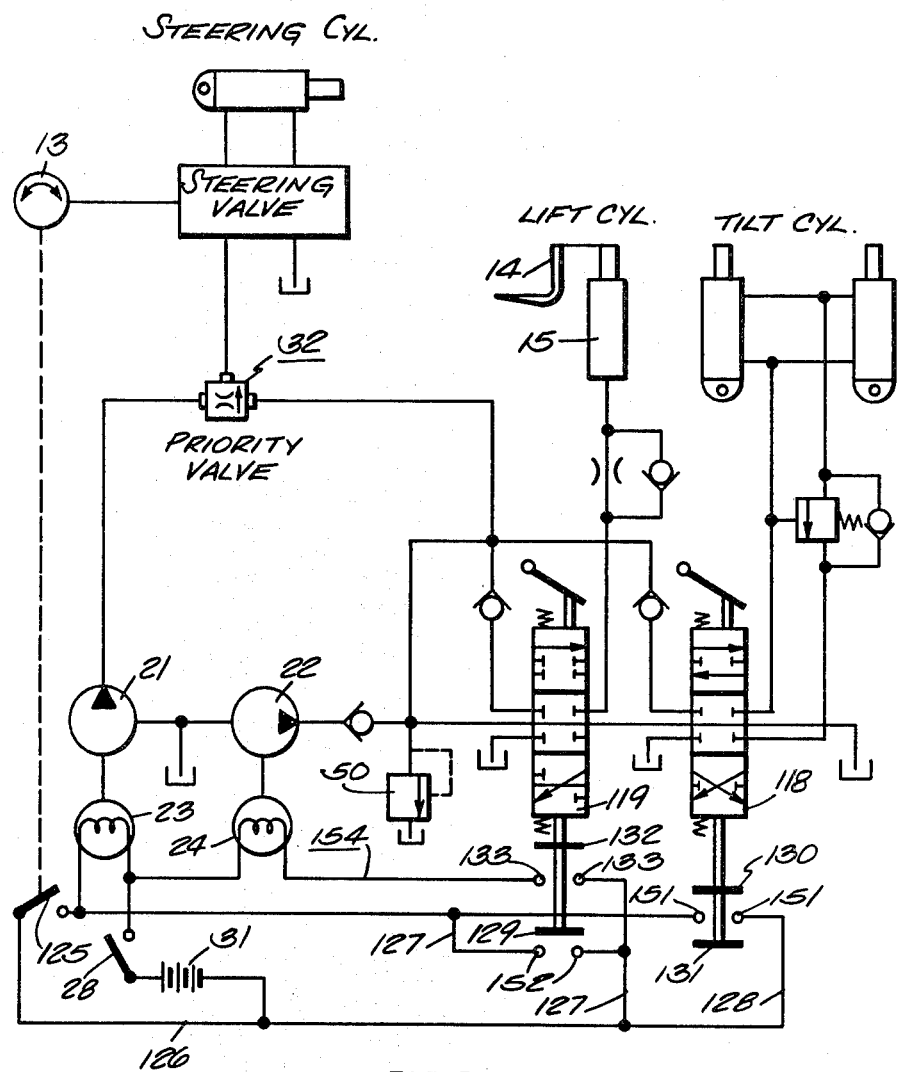
FIG. 3 is a schematic showing of a third embodiment of a hydraulic control system for a lift truck wherein the pumps are operated only on "demand".

A third embodiment of the invention is illustrated in FIG. 3. In the third embodiment, an electric circuit 126 for the electric motor 23 for driving the pump 21, includes a switch 125 which is closed to drive the pump 21 when the operator rotates the manually operated steering wheel 13 in either direction. (The switch 28 is closed when the lift truck is operated.) Thus, the pump 21 is operated to supply pressure fluid for steering only "on demand" of the lift truck operator. Additionally, parallel electric circuits 127, 128 are provided for the electric motor 23 for the pump 21, whereby the pump 21 is operated "on demand" of the lift truck operator, as by the operator moving the spool of the tilt control valve 118 up or down from its illustrated hold position to its operating positions in which its contactors 130, 131 engage contacts 151 of circuit 128 or by the operator moving the spool of the lift control valve 119 from its illustrated hold position to its first predetermined "raise" position wherein its contactor 129 engages contact 152 to energize circuit 127. If the operator desires a high speed lift, he moves the spool of the lift control valve 119 downwardly a further distance to a second predetermined "raise" position in which its con-tactor 132 engages contacts 133 thus energizing a circuit 154 causing the electric motor 24 to drive the pump 22. Thus, the embodiment of the invention illustrated in FIG. 3 is a "demand" system wherein the pumps for the hydraulic fluid control system are driven only when the operator selects a particular function to be performed by the operating cylinders of the system.

The invention as illustrated and described provides a hydraulic control system particularly useful in an electric lift truck wherein the conservation of electric energy is extremely important. A relatively low volume pump 21 may be utilized for the steering and tilt cylinder functions (and for a slow speed lift function as well) without requiring the high volume pump 22 to be driven. The high volume pump 22 is selectively driven only when the operator desires a high speed lift. This system conserves considerable electrical energy as compared to a system wherein high and low volume pumps are continuously driven. In the FIGS. 1 and 2 embodiments, the low capacity pump 21 is driven whenever the lift truck is being operated, whereas in the embodiment of FIG. 3, the low capacity pump 21 is driven only "on demand" of the operator as expressed by his operation of the steering wheel 13, lift valve 19 or tilt valve 18. The embodiments of the invention illustrated in FIGS. 2 and 3 allow the operator to accomplish low speed carriage lift without driving pump 22 thus saving energy when only low speed lifting is required.

The embodiment of the invention in which an exclusive property or privilege is claimed are defined as follows:

1. A lift truck hydraulic control system for a lift truck of the type having a hydraulic lift cylinder controlled by a lift control valve having a lower position, a hold position and first and second pressure fluid delivery positions for expanding the lift cylinder, a hydraulic tilt cylinder controlled by a tilt control valve having a hold position and a pair of pressure fluid delivery positions for effecting expansion and contraction of said tilt cylinder and a steering mechanism including a hydraulic steering motor controlled by a steering control valve having a neutral position and fluid pressure delivery positions for effecting operation of the steering motor, the control system characterized by
    first and second hydraulic pumps;
    first and second electric motors connected in driving relation to said first and second pumps, respectively;
    a single priority valve having
    an input connected in fluid receiving relation to said first pump,
    a high priority output connected in fluid delivery relation to said steering control valve and
    a low priority output connected in direct fluid delivery relation to each of said tilt and lift control valves;
    a fluid delivery circuit connecting said second pump in fluid delivery relation to said lift control valve independent of said priority valve;
    first control means associated with each of said steering control valve, tilt control valve, and lift control valve for automatically causing said first electric motor to drive said first pump when at least one of the following three shifting movements occurs:
    said steering control valve is shifted from its neutral position to one of its pressure fluid delivery positions, said tilt control valve is shifted from its hold position to one of its fluid pressure delivery positions, said lift control valve is shifted to its first pressure fluid delivery position; and second control means automatically causing said second electric motor to drive said second pump when said lift control valve is moved to its second pressure fluid delivery position whereby said second pump delivers pressure fluid to said cylinder by way of said lift control valve.

* * * * *